(12) United States Patent
Nam et al.

(10) Patent No.: US 10,788,336 B2
(45) Date of Patent: Sep. 29, 2020

(54) LIGHTWEIGHT SENSOR PIECE AND METHOD OF MANUFACTURING THE SAME

(71) Applicants: Hyundai Motor Company, Seoul (KR); Kia Motors Corporation, Seoul (KR)

(72) Inventors: Duk-Hyun Nam, Osan-si (KR); Ga-Yeon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 15/789,084

(22) Filed: Oct. 20, 2017

(65) Prior Publication Data

US 2018/0156636 A1    Jun. 7, 2018

(30) Foreign Application Priority Data

Dec. 6, 2016   (KR) .................. 10-2016-0165215

(51) Int. Cl.
*G01D 5/14* (2006.01)

(52) U.S. Cl.
CPC ............... *G01D 5/14* (2013.01); *G01D 5/145* (2013.01)

(58) Field of Classification Search
CPC . G01D 5/14; G01D 5/145; F01L 1/047; F01L 1/46
See application file for complete search history.

(56) References Cited

U.S. PATENT DOCUMENTS

2017/0248044 A1* 8/2017 Methley .................. F01L 1/047

FOREIGN PATENT DOCUMENTS

KR   10-2010-0118703 A   11/2010
KR   20-2010-0010946 U   11/2010

* cited by examiner

*Primary Examiner* — David Z Huang
(74) *Attorney, Agent, or Firm* — Morgan, Lewis & Bockius LLP (57) ABSTRACT

A lightweight sensor member may include a fastening hole formed through a center thereof to be fastened to a camshaft, and a plurality of detecting protrusions formed on an external peripheral surface thereof, each having a certain angular shape to the fastening hole.

12 Claims, 9 Drawing Sheets

LIGHTWEIGHT SENSOR PIECE AND METHOD OF MANUFACTURING THE SAME

CROSS-REFERENCE(S) TO RELATED APPLICATIONS

The present application claims priority to Korean Patent Application No. 10-2016-0165215 filed on Dec. 6, 2016, the entire contents of which is incorporated herein for all purposes by this reference

BACKGROUND OF THE INVENTION

Field of the Invention

The present invention relate to a sensor member; and, particularly, to a lightweight sensor member used in an engine camshaft for a vehicle.

Description of Related Art

In general, a camshaft having a predetermined length and thickness is provided with a plurality of cam lobes, which are arranged at predetermined distances on the outer periphery thereof and have different phases, and a sensor member. An engine is driven along with the rotation of the camshaft.

The camshaft is provided with cams arranged thereon and sequentially opens and closes intake and exhaust valves according to the rotation thereof. As such a camshaft, there are an integral camshaft, in which a shaft and cams are integrally made of alloy cast iron, and a hollow-assembled camshaft in which cams (cam lobes) are coupled to a hollow shaft formed of a drawing steel pipe.

In addition, a gear and a sprocket are coupled to ends of the camshaft to drive the camshaft, or a sensor member is coupled to an end of the camshaft to accurately determine a timing of injection of fuel into an engine cylinder according to the rotation of the camshaft.

This sensor member is typically produced by sintering an iron-based powder, and has a sensing protrusion and a sensing groove that are accurately processed at a suitable angle on the circumferential surface thereof.

Accordingly, when the size of the sensing protrusion is reduced for easy mounting of the sensor member, the distance from the center of the sensor member to the sensing groove has to be small in order to maintain the performance of the sensor member. This may cause a reduction in the thickness of the sensor member and deterioration in the production and assembly of parts.

In addition, when the difference in height between a reference surface and a measurement surface for accurately determining the position of a sensor is increased to improve the performance of the sensor member, this may cause deterioration in the capability of detecting signals and deterioration in the production and assembly of parts.

In particularly, when the thickness of the sensor member is small due to the characteristics of iron-based powder after sintering, the occurrence of cracks may be largely increased in an assembly process.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lightweight sensor member with improved production and assembly while maintaining detecting accuracy, and a method of manufacturing the same.

Various aspects of the present invention are directed to providing a lightweight sensor member configured for preventing cracks from occurring when the sensor member is assembled to a camshaft even though it has a reduced thickness, and a method of manufacturing the same.

Various aspects of the present invention are directed to providing a lightweight sensor member configured for having a compact size and/or a reduced weight, and a method of manufacturing the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a lightweight sensor member with improved production and assembly while maintaining detecting accuracy.

The lightweight sensor member includes a fastening hole formed through a center thereof to be fastened to a camshaft, and a plurality of detecting protrusions formed on an external peripheral surface thereof, each having a certain angular shape to the fastening hole.

The lightweight sensor member may be made of a magnetic material.

The certain angular shape may be at an angle of about 90°.

The detecting protrusions may have different widths for position detection by a sensor.

Detecting grooves having different widths may be formed between the detecting protrusions.

A strength reinforcing groove may be formed in an internal diameter portion formed by subtracting a radius of the fastening hole from a distance from a center of the fastening hole to the external peripheral surface of the lightweight sensor member, the strength reinforcing groove being stepped from the external peripheral surface.

The distance from the center of the fastening hole to the external peripheral surface of the lightweight sensor member may not be changed for easy mounting of the lightweight sensor member, whereas a distance from the center of the fastening hole to an external peripheral surface of each of the detecting protrusions may be changed.

The lightweight sensor member may be made of a metal plate.

The metal plate may have a thickness of about 0.8 to 2.0 mm.

The metal plate may have a tensile strength of about 340 MPa to 600 MPa to secure a press-in force.

The certain angular shape may be corrected by a roller device after it is formed by a bending device.

The detecting protrusions may include two first detecting protrusions distanced from each other by a first distance, the first detecting protrusions having the same first circumference, and two second detecting protrusions distanced from each other by a second distance, the second detecting protrusions having the same second circumference smaller than the first circumference.

In accordance with another exemplary embodiment of the present invention, a method of manufacturing a lightweight sensor member includes forming a lightweight sensor member for a camshaft, the lightweight sensor member having a fastening hole formed through a center thereof to be fastened to the camshaft and a plurality of external diameter portions protruding from an external peripheral surface thereof, forming a plurality of detecting protrusions by fixing the external diameter portions to a lower mold and by bending the external diameter portions using an upper mold, and correcting the detecting protrusions using rollers disposed in the upper mold so that each of the detecting protrusions has a certain angular shape to the fastening hole.

The forming a lightweight sensor member may include cutting a metal plate using a shearing machine, forming the cut metal plate using a forming machine, and piercing the fastening hole using a piercing machine.

The forming a lightweight sensor member may further include burring a surface of the lightweight sensor member using a burring machine after the piercing the fastening hole.

The forming a lightweight sensor member may further include additionally piercing the fastening hole using the piercing machine after the burring a surface of the lightweight sensor member.

The correcting the detecting protrusions may include removing the lower mold, additionally dropping the upper mold such that the rollers disposed in the upper mold face bent portions of the detecting protrusions, and rotating the upper mold such that the detecting protrusions are corrected to each have the certain angular shape.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

The terms including expressions including first, second, A and/or B, used in the specification of the present invention may be used to describe various elements of the present invention. However, the elements of the present invention may not be limited by the terms used in the specification of the present invention. In other words, such terms will be used to differentiate one element from other elements of the present invention. For example, without deviating from the scope and spirit of the present invention, a first element may be referred to as a second element, and, similarly, a second element may also be referred to as a first element. As used herein, the term "and/or" includes any and all combinations of one or more of the associated listed items.

Hereinafter, a lightweight sensor member and a method of manufacturing the same according to exemplary embodiments of the present invention will be described in detail with reference to the accompanying drawings.

Figure 1:
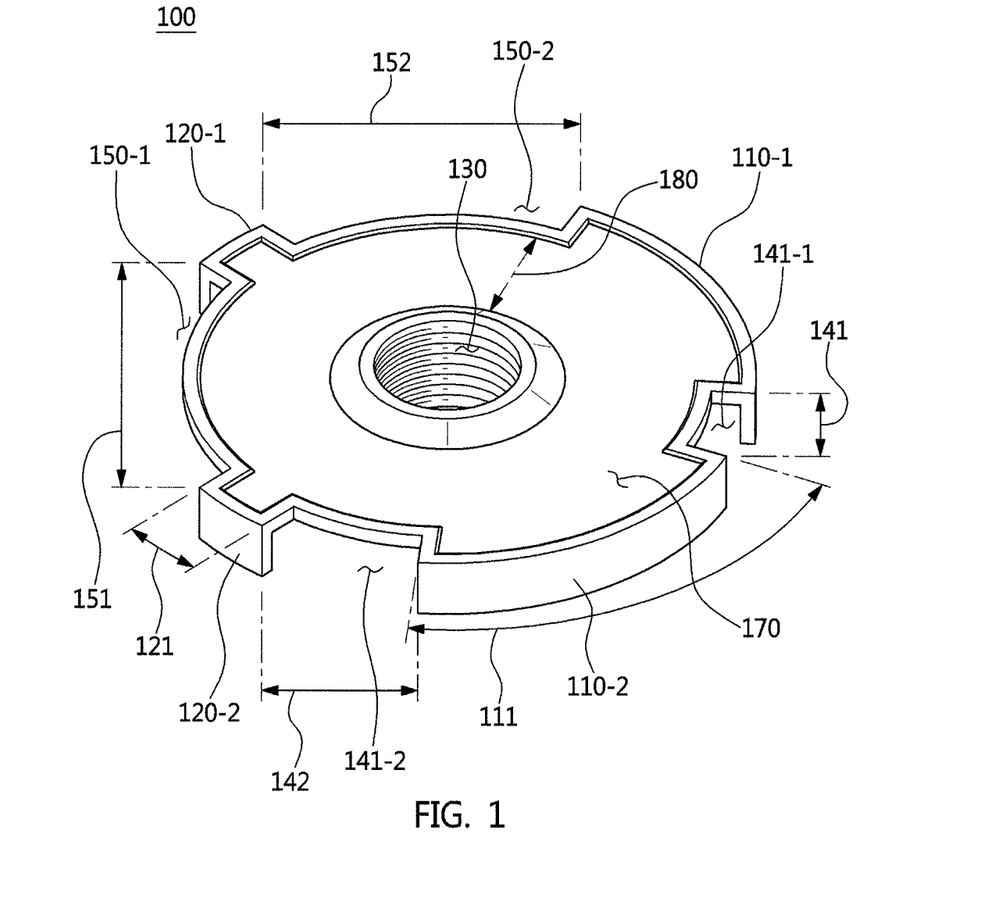
FIG. 1 is a perspective view illustrating a lightweight sensor member according to an exemplary embodiment of the present invention.

FIG. 1 is a perspective view illustrating a lightweight sensor member according to an exemplary embodiment of the present invention. Referring to FIG. 1, the lightweight sensor member which is designated by reference numeral 100 has a fastening hole 130 formed through the center thereof to be fastened to a camshaft, In addition, the lightweight sensor member 100 has detecting protrusions 110-1, 110-2, 120-1, and 120-2 that are formed on the external peripheral surface thereof while each having a certain angular shape to the fastening hole 130.

The detecting protrusions 110-1, 110-2, 120-1, and 120-2 include first and second detecting protrusions 110-1 and 110-2, which are distanced from each other by a first distance 141 and have the same first circumference 111, and third and fourth detecting protrusions 120-1 and 120-2 which are distanced from each other by a third distance 151 and have the same second circumference 121 smaller than the first circumference 111.

Here, the fourth detecting protrusion 120-2 is distanced from the second detecting protrusion 110-2 by a second distance 142, and the first detecting protrusion 110-1 is distanced from the third detecting protrusion 120-1 by a fourth distance 152.

For these distances 141, 142, 151, and 152, first to fourth detecting grooves 141-1, 141-2, 150-1, and 150-2 having different widths (i.e. Distances) are formed between the first to fourth detecting protrusions 110-1 to 120-2. The widths correspond to the first to fourth distances 141 to 152, respectively.

The reason the detecting grooves have different widths is to detect positions of the detecting protrusions by a sensor, In other words, the lightweight sensor member 100 is coupled to the camshaft, and rotates according to the driving of an engine. In the instant case, the sensor detects the positions of the first to fourth detecting protrusions 110-1 to 120-2 to determine an injection timing. That is, the widths between the first to fourth detecting protrusions 110-1 to 120-2 are different from each other for position detection.

In addition, the first to fourth detecting protrusions 110-1 to 120-2 are each formed to be bent inward at an angle of about 90° on the external peripheral surface thereof to have an angular shape to the fastening hole 130. That is, the detecting protrusion has a clamp shape. The angular shape of the detecting protrusion is finally formed by a roller device after it is formed by a bending device.

In addition, the lightweight sensor member 100 may be made of a magnetic material including steel or a magnetic alloy. The lightweight sensor member 100 is formed by blanking, forming, piercing, and bending a metal plate. This process differs from a sintering process and is to prevent problems, for example occurrence of cracks.

The metal plate may have a thickness of about 0.8 to 2.0 mm. The metal plate needs to have a thickness of about 0.8 mm or more for stable pressing. When the metal plate has a thickness of about 2.0 mm or more, it is difficult to form the thickness of about 0.8 mm and to achieve a reduction in weight. Therefore, the thickness of the metal plate may be restricted to be less than 2.0 mm.

In addition, the metal plate may be made of a material having a tensile strength of about 340 MPa to 600 MPa to secure a press-in force. That is, when the tensile strength is equal to or more than 600 MPa, abnormality may occur when the metal plate is bent. Therefore, the maximum tensile strength of the metal strength is limited to 600 MPa.

In addition, the lightweight sensor member 100 has a strength reinforcing groove 170 formed on the surface of an internal diameter portion 180 thereof, wherein the strength reinforcing groove 170 is stepped from the external peripheral surface of the sensor member. The strength reinforcing groove 170 may prevent the sensor member from being distorted and deformed. Here, the internal diameter portion 180 is a region obtained by subtracting the radius of the fastening hole 130 from the distance from the center of the fastening hole 130 to the external peripheral surface. Although FIG. 1 illustrates that the strength reinforcing groove 170 is formed at the upper surfaces of the first to fourth detecting protrusions 110-1 to 120-2, the strength reinforcing groove 170 may be formed only on the internal diameter portion.

Figure 2:
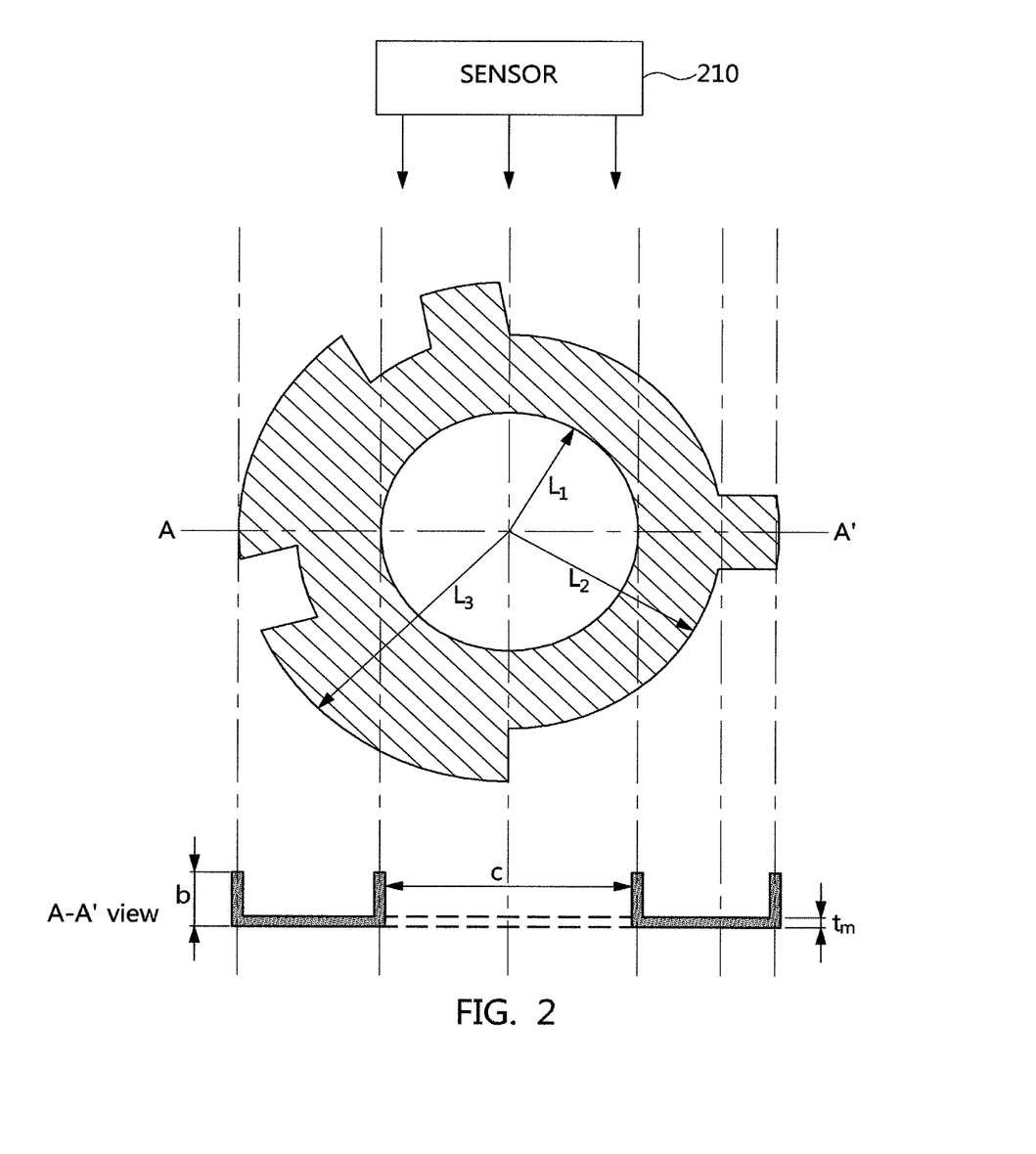
FIG. 2 is a conceptual view for explaining design factors of the lightweight sensor member illustrated in FIG. 1.

FIG. 2 is a conceptual view for explaining design factors of the lightweight sensor member illustrated in FIG. 1. The sensor member is designed considering the following six factors:

an internal radius ($L_1$) of the sensor member for mounting it to the camshaft;

a reference surface external radius ($L_2$) of the sensor member for measurement;

a measurement surface external radius ($L_3$) of the sensor member for measurement;

a difference in height between a reference surface and a measurement surface ($\Delta h = L_3 - L_2$) for determining an accurate position of a sensor 210;

a thickness ($t = L_2 - L_1$) of the sensor member for stable fastening thereof; and a total thickness of the sensor member for accurate recognition of the sensor 210.

Accordingly, for the accurate recognition of the sensor 210, it is advantageous for the difference in height ($\Delta h$) and the total thickness to be large. In addition, considering the mounting of an engine, it is advantageous for the measurement surface external radius ($L_3$) and the total thickness to be small and it is advantageous for the internal radius ($L_1$) to have a high degree of freedom. Considering production and assembly, it is advantageous for the thickness (t) to be large.

However, according to the exemplary embodiment of the present invention illustrated in FIG. 2, since the difference in height ($\Delta h$) that affects the performance of the sensor 210 is not $L_3 - L_2$ but is $L_3 - (L_1 + t_m)$, the present invention is improved compared to the typical design described above.

In addition, since the difference in height ($\Delta h$) is sufficient and thus the sensor member does not affect peripheral parts (e.g. Cam lobes), the sensor member has a high degree of position freedom. Therefore, it is possible to contribute to a reduction in the size of the engine. In addition, since a height (b) is formed not by the total thickness of the sensor member but by processing the plate, the height (b) can be freely adjusted.

In addition, since there is no need to change the reference surface external radius ($L_2$) when the measurement surface external radius ($L_3$) is reduced to improve mounting of an engine, the sensor member has a high degree of shape freedom. In other words, the distance from the center of the fastening hole 130 to the external peripheral surface of the sensor member is not changed, and the distance from the center of the fastening hole to the external peripheral surface of each of the detecting protrusions may be changed.

In addition, the factors that affect production and/or assembly are not the thickness (t) but are a raw material thickness ($t_m$) and a fastening width (c) of the fastening hole 130, the sensor member may be stably managed.

In addition, since the sensor member is formed at the same thickness as the plate except for important portions (b and c), the weight of the sensor member can be reduced by over 80%. The cost of materials can be reduced by the reduction in the weight of the sensor member, and the cost of parts can be reduced by about 60% owing to simplification of processes.

Figure 3:
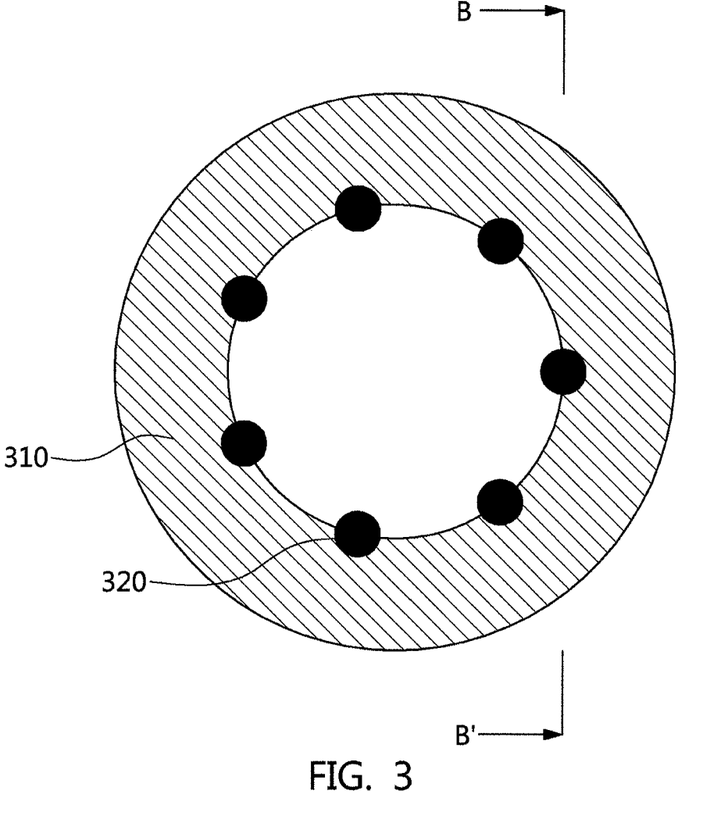
FIG. 3 is a conceptual plan view illustrating an upper mold used in a method of manufacturing the lightweight sensor member of FIG. 1.

FIG. 3 is a conceptual plan view illustrating an upper mold used in a method of manufacturing the lightweight sensor member of FIG. 1. FIG. 3 is a conceptual view for explaining a bending process after performing a step of cutting a metal plate using a shearing machine, a step of forming the cut metal plate using a forming machine, and a step of forming a fastening hole using a piercing machine.

Of course, the method may further include a step of burring the surface of a sensor member using a burring machine after the step of forming a fastening hole using a piercing machine.

In addition, the method may further include a step of piercing the fastening hole using the piercing machine after the step of burring the surface of a sensor member using a burring machine. Of course, these processes are illustrated by way of example only, and may be changed as necessary.

Typically, it is difficult to form a metal plate at an angle adjacent to about 90° in the bending process after the metal plate is cut (i.e. blanked). Accordingly, the method according to the exemplary embodiment of the present invention further includes a correction process (see FIGS. 7 to 9) after the bending process (see FIGS. 5A, 5B, and 6) to form the metal plate to have a right angular shape. That is, the surface of the protrusions (110-1, 110-2, 120-1, and 120-2) has to be at a right angle to the bottom surface of the metal plate as much as possible to secure the performance of parts. In other words, the sensor member may be tapered at a maximum angle of about 3°. To overcome this problem, it is important to design molds in the bending process.

FIG. 3 is a top view illustrating the upper surface of an upper mold 310. A plurality of rollers 320 are circularly disposed inside the upper end portion of the upper mold 310.

Figure 4:
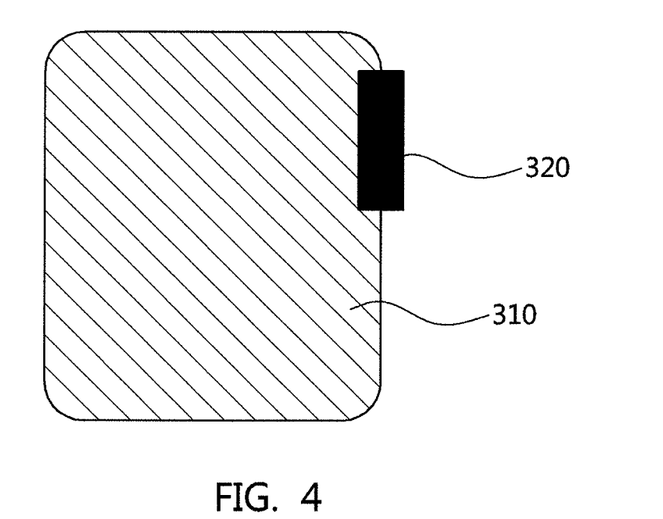
FIG. 4 is a cross-sectional view taken along line B-B' of FIG. 3.

FIG. 4 is a cross-sectional view taken along line B-B' of FIG. 3. FIG. 4 illustrates that one of the rollers 320 is disposed at the upper end portion of the upper mold 320.

Figure 5A:
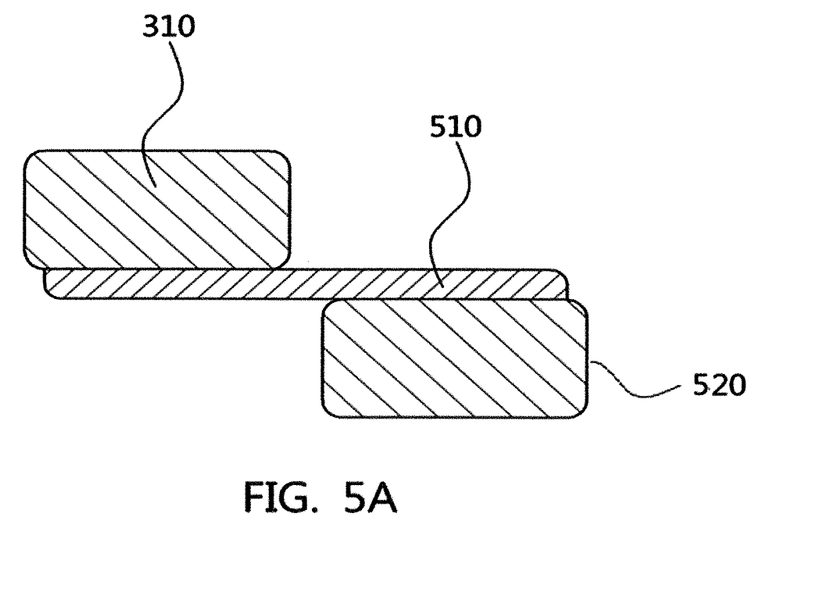
FIG. 5A is a conceptual view of an arrangement process illustrating a positional relationship between a plate and upper and lower molds for bending the plate in the method of manufacturing the lightweight sensor member of FIG. 1.
Figure 5B:
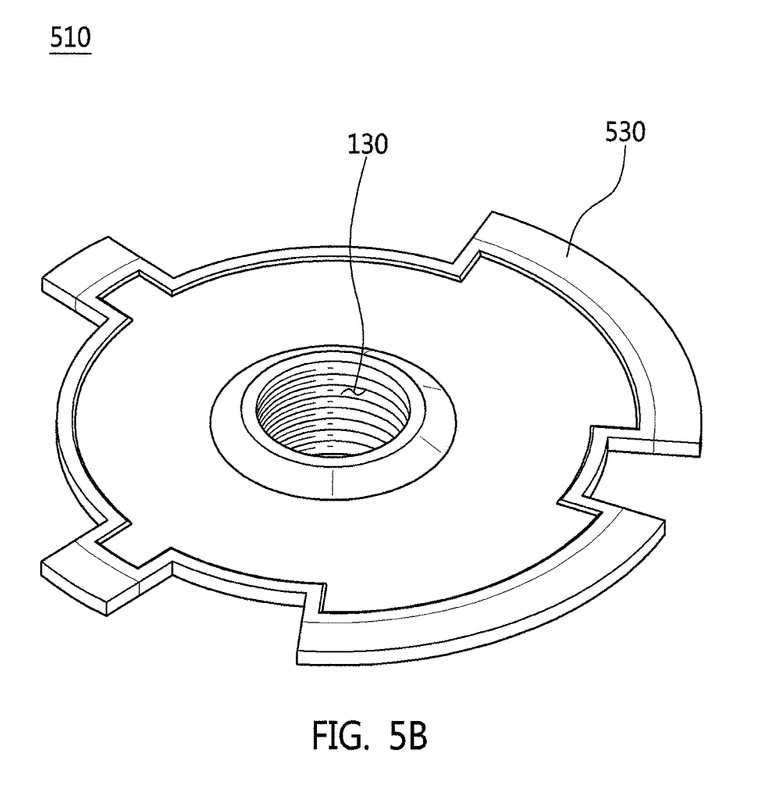
FIG. 5B is a perspective view illustrating the lightweight sensor member before the bending of FIG. 6.

FIG. 5A is a conceptual view of an arrangement process illustrating a positional relationship between a plate and upper and lower molds for bending the plate in the method of manufacturing the lightweight sensor member of FIG. 1. FIG. 5B is a perspective view illustrating the lightweight sensor member before the bending of FIG. 6. Referring to FIGS. 5A and 5B, before a lightweight sensor member 510 is bent in a lower mold 510, a plurality of external diameter portions 530 of the lightweight sensor member 510 is fixed to the upper end surface of the lower mold 510 and the end portions of the external diameter portions 530 are fixed to the lower end surface of the upper mold 310.

Figure 6:
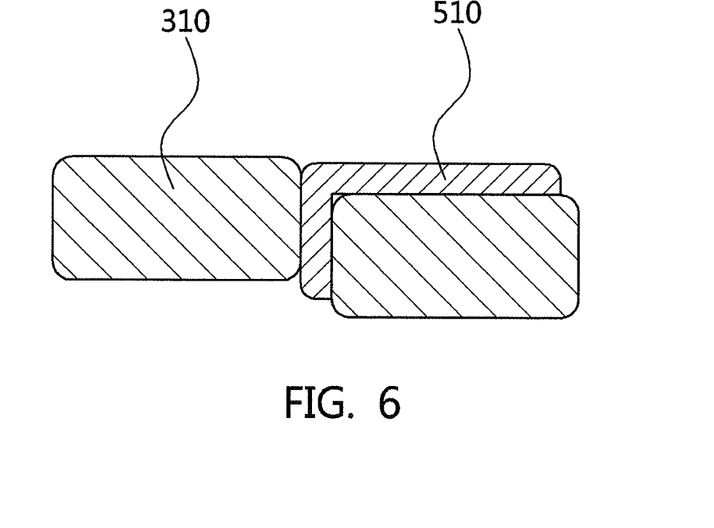
FIG. 6 is a conceptual view illustrating a bending process after the arrangement process of FIG. 5A.

FIG. 6 is a conceptual view illustrating a bending process after the arrangement process of FIG. 5A. Referring to FIG. 6, in a state in which the external diameter portions 530 are fixed to the upper end surface of the lower mold 510, the external diameter portions 530 are bent according the downward movement of the upper mold 310 by a load for molding so that a plurality of detecting protrusions 110-1, 110-2, 120-1, and 120-2 (see FIG. 1) is formed.

Figure 7:
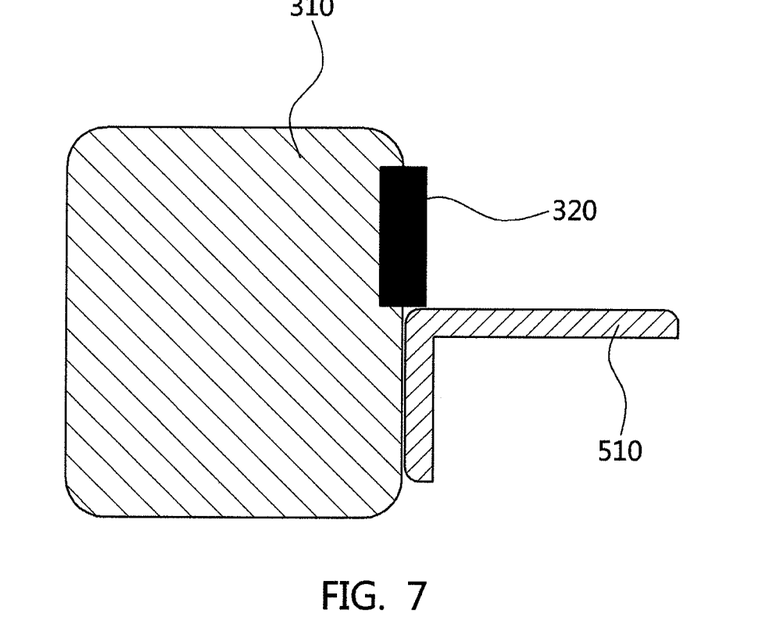
FIG. 7 is a conceptual view illustrating a lower mold removal process after the bending process of FIG. 6.

FIG. 7 is a conceptual view illustrating a lower mold removal process after the bending process of FIG. 6. Referring to FIG. 7, the lower mold 520 is removed after the bending process is completed.

Figure 8:
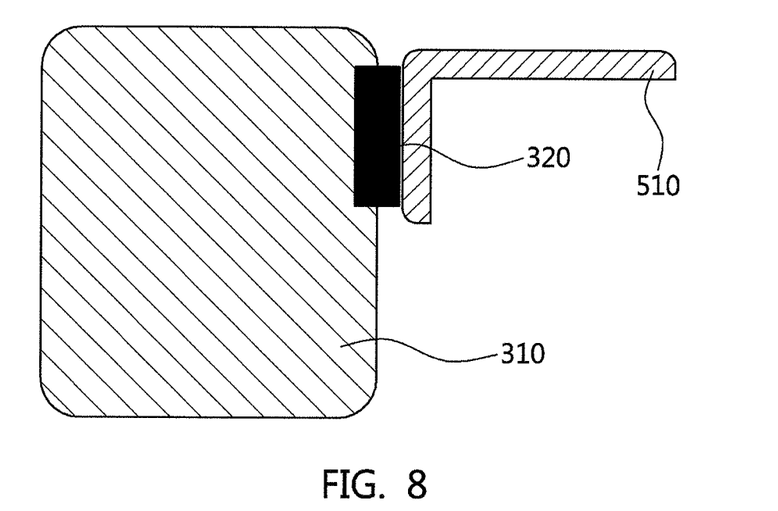
FIG. 8 is a conceptual view illustrating an additional upper mold drop process after the lower mold removal process of FIG. 7.

FIG. 8 is a conceptual view illustrating an additional upper mold drop process after the lower mold removal process of FIG. 7. Referring to FIG. 8, the upper mold 310 is additionally dropped such that rollers 320 disposed in the upper mold 310 face the bent portions of the detecting protrusions 110-1, 110-2, 120-1, and 120-2 (see FIG. 1).

Figure 9:
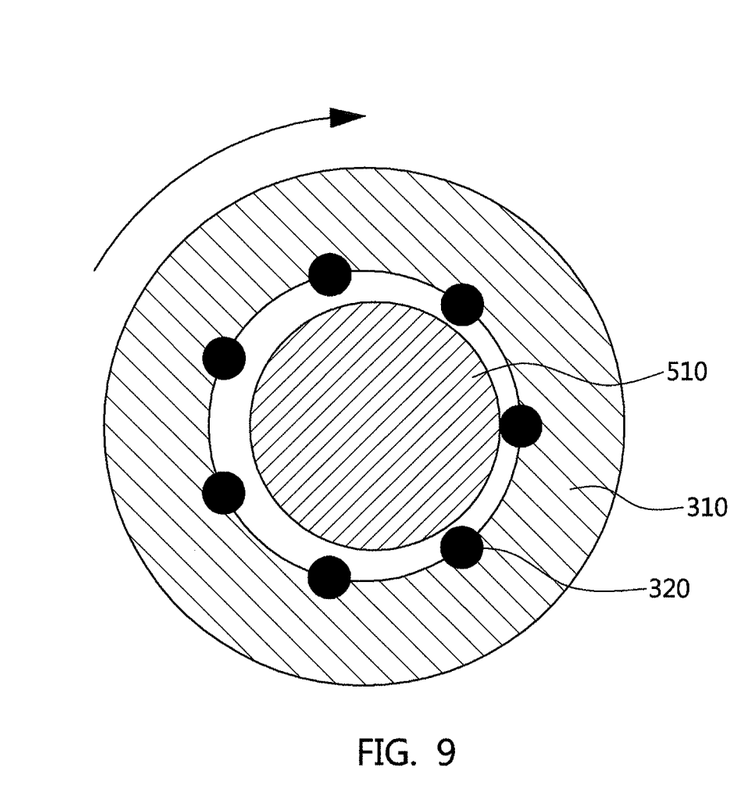
FIG. 9 is a conceptual view illustrating an upper mold rotation process after the additional upper mold drop process of FIG. 8.

FIG. 9 is a conceptual view illustrating an upper mold rotation process after the additional upper mold drop process of FIG. 8. Referring to FIG. 9, the upper mold 310 rotates in a state in which a load is laterally applied to the detecting protrusions 110-1, 110-2, 120-1, and 120-2 (see FIG. 1) such that each of the detecting protrusions has a right angular shape. In the instant case, the detecting protrusions 110-1, 110-2, 120-1, and 120-2 (see FIG. 1) are additionally bent inward by the rollers 320 disposed in the upper mold 310 to be accurately angled at an angle of 90°.

Figure 10:
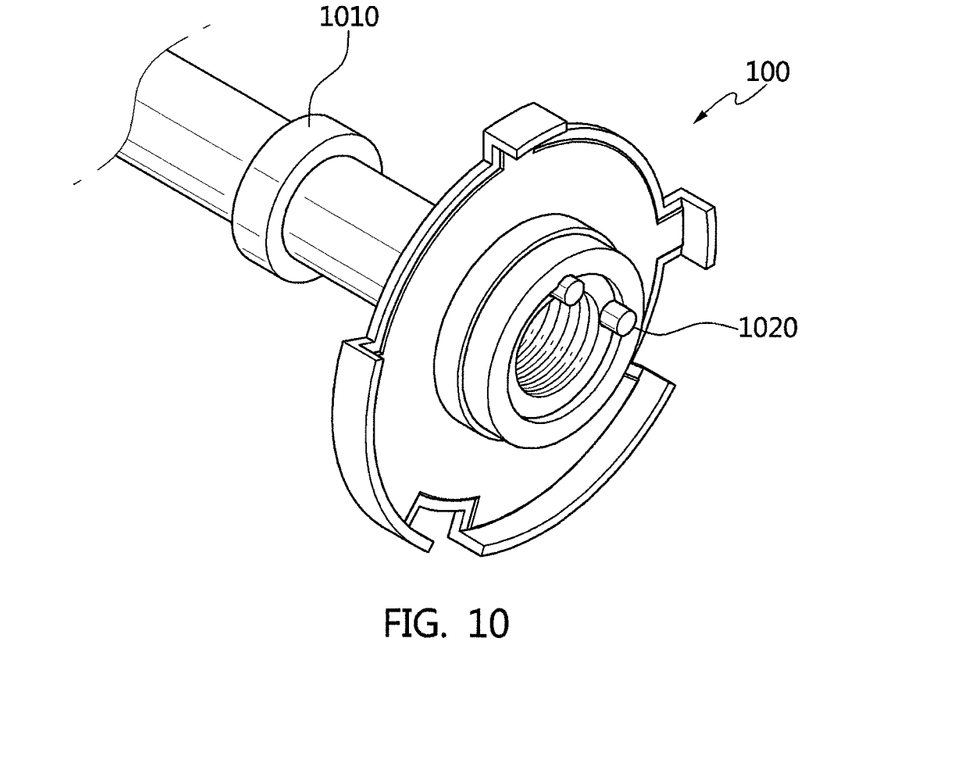
FIG. 10 is a perspective view illustrating a state in which the lightweight sensor member of FIG. 1 is assembled to a camshaft.

FIG. 10 is a perspective view illustrating a state in which the lightweight sensor member of FIG. 1 is assembled to a camshaft. FIG. 10 illustrates that the lightweight sensor member 100 is fastened to a camshaft 1020 to which a cam 1010 is assembled.

Figure 11:
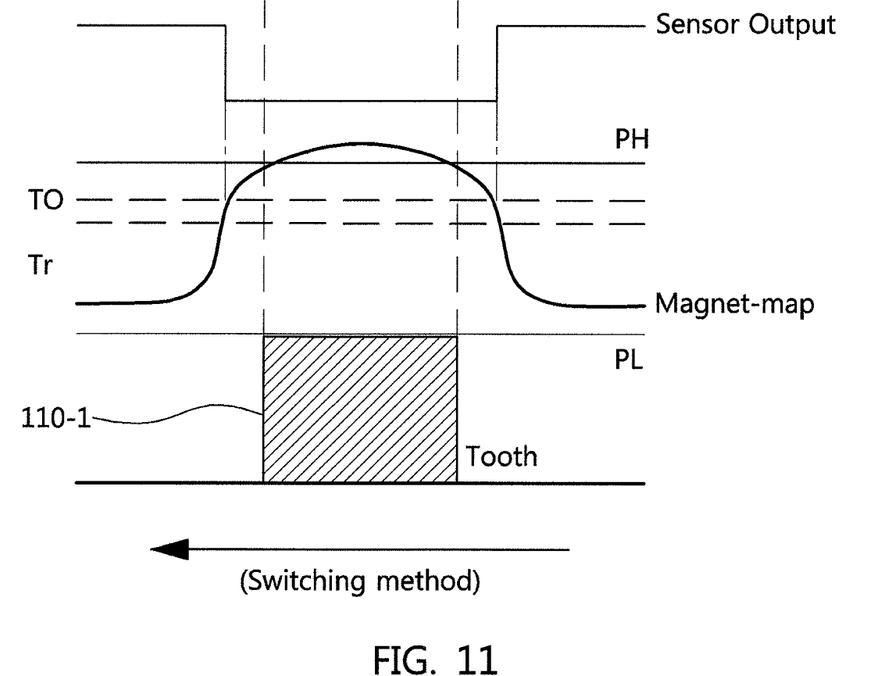
FIG. 11 is a waveform diagram for explaining a principle of signal detection using a typical sensor member and sensor.

FIG. 11 is a waveform diagram for explaining a principle of signal detection using a typical sensor member and sensor. FIG. 11 illustrates that a waveform is changed by a detecting protrusion 110-1 while a sensor member 100 rotates according to the rotation of a camshaft 1020. That is, when the sensor member 100 rotates, a sensor 100 changes a magnet map signal to the same-shaped voltage to output the voltage as a digital signal.

In accordance with exemplary embodiments of the present invention, since a sensor member is manufactured by forming a plate, it is possible to improve the production and assembly of the sensor member while maintaining detecting accuracy. Thus, it is possible to reduce costs and reduce the weight of the sensor member.

In addition, since the dimensional accuracy of the sensor member is adapted while the sensor member is manufactured, there is no need for separate processing processes.

In addition, it is possible to reduce the thickness of an internal diameter portion to reduce the size of parts and to secure stably press the internal diameter portion by increasing the thickness of the pressed internal diameter portion. Thus, it is possible to overcome space restriction.

Moreover, even though the thickness of the internal diameter portion is increased, the weight of the sensor member is not largely increased since it includes the plate.

Furthermore, since the difference in height between the groove and the protrusion of the sensor member itself is sufficient and thus the sensor member does not affect peripheral parts (e.g. Cam lobes), the sensor member can have a high degree of position freedom. Therefore, it is possible to contribute to a reduction in the size of a vehicle engine.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lightweight sensor member comprising:
   a fastening hole formed through a center of the lightweight sensor member to be fastened to a camshaft; and
   a plurality of detecting protrusions formed on an external peripheral surface of the lightweight sensor member, each having a predetermined angular shape to the fastening hole,
   wherein a difference ($\Delta h$) in height between a reference surface of the lightweight sensor member and a measurement surface of the lightweight sensor member, for affecting performance of the lightweight sensor member is determined according to a following formula:
   $\Delta h = L_3 - (L_1 + t_m)$, wherein $L_3$ is a measurement surface external radius of the plurality of detecting protrusions, $L_1$ is an internal radius of the lightweight sensor member, and $t_m$ is a thickness of a raw material of the lightweight sensor member.

2. The lightweight sensor member of claim 1, wherein the lightweight sensor member is made of a magnetic material.

3. The lightweight sensor member of claim 1, wherein the predetermined angular shape is at an angle of 90°.

4. The lightweight sensor member of claim 1, wherein the detecting protrusions have different widths for position detection by a sensor.

5. The lightweight sensor member of claim 4, wherein the detecting protrusions comprise two first detecting protrusions distanced from each other by a first distance, the first detecting protrusions having a same first circumference, and two second detecting protrusions distanced from each other by a second distance, the second detecting protrusions having a same second circumference smaller than the first circumference.

6. The lightweight sensor member of claim 1, wherein detecting grooves having different widths are formed between the detecting protrusions.

7. The lightweight sensor member of claim 1, wherein a strength reinforcing groove is formed in an internal diameter portion of the lightweight sensor member formed by subtracting a radius of the fastening hole from a distance from a center of the fastening hole to the external peripheral surface of the lightweight sensor member, the strength reinforcing groove being stepped from the external peripheral surface.

8. The lightweight sensor member of claim 7, wherein the distance from the center of the fastening hole to the external peripheral surface of the lightweight sensor member is equal for mounting of the lightweight sensor member, whereas a distance from the center of the fastening hole to an external peripheral surface of each of the detecting protrusions is different.

9. The lightweight sensor member of claim 1, wherein the lightweight sensor member is made of a metal plate.

10. The lightweight sensor member of claim 9, wherein the metal plate has a thickness of 0.8 to 2.0 mm.

11. The lightweight sensor member of claim 9, wherein the metal plate has a tensile strength of 340 MPa to 600 MPa to secure a press-in force.

12. The lightweight sensor member of claim 1, wherein the predetermined angular shape is corrected by a roller device after the predetermined angular shape is formed by a bending device.

* * * * *